(12) United States Patent
Yang et al.

(10) Patent No.: US 6,661,679 B1
(45) Date of Patent: Dec. 9, 2003

(54) PWM CONTROLLER HAVING ADAPTIVE OFF-TIME MODULATION FOR POWER SAVING

(75) Inventors: Ta-yung Yang, Taipei (TW); Jenn-yu G. Lin, Taipei (TW)

(73) Assignee: System General Corporation, Milpitas, CA (US)

( * ) Notice: Subject to any disclaimer, the term of this patent is extended or adjusted under 35 U.S.C. 154(b) by 5 days.

(21) Appl. No.: 10/065,531

(22) Filed: Oct. 28, 2002

(51) Int. Cl.$^7$ .......................... H02M 1/14; H02M 3/335

(52) U.S. Cl. ..................................... 363/41; 363/21.18

(58) Field of Search .................. 363/21.01, 21.1, 363/21.11, 21.18, 26, 41, 97

(56) References Cited

U.S. PATENT DOCUMENTS

| | | | |
|---|---|---|---|
| 5,828,558 A | * 10/1998 | Korcharz et al. | 363/20 |
| 5,969,962 A | * 10/1999 | Gabor | 363/89 |
| 6,049,471 A | * 4/2000 | Korcharz et al. | 363/20 |
| 6,100,675 A | 8/2000 | Sudo | 323/282 |
| 6,101,106 A | * 8/2000 | Shi | 363/41 |
| 6,191,676 B1 | * 2/2001 | Gabor | 336/160 |
| 6,295,211 B1 | 9/2001 | Nishida et al. | 363/19 |
| 6,314,010 B1 | 11/2001 | Markow et al. | 363/97 |
| 6,366,070 B1 | 4/2002 | Cooke et al. | 323/284 |
| 6,434,021 B1 | * 8/2002 | Collmeyer et al. | 363/21.01 |
| 6,469,914 B1 | * 10/2002 | Hwang et al. | 363/21.01 |

* cited by examiner

Primary Examiner—Adolf D. Berhane
(74) Attorney, Agent, or Firm—Jianq Chyun IP Office

(57) ABSTRACT

An adaptive off-time modulator of a PWM controller is provided for power saving in the light-load and no-load conditions. The maximum on-time is kept as a constant and a bias current of the oscillator in the PWM controller is moderated to achieve the off-time modulation. Reduction of the bias current increases the off-time of the switching period. The bias current is a function of the supply voltage and the feedback voltage, which is derived from a voltage feedback loop. A threshold voltage defines the level of the light load. A limit voltage defines the low level of the supply voltage. A bias current synthesizer generates the bias current. Once the feedback voltage is decreased lower than the threshold voltage, the bias current is reduced linearly and the off-time of the switching period is increased gradually. When the supply voltage is lower than the limit voltage, the bias current increases and determines a maximum off-time of the switching period. The maximum on-time and off-time of the switching period determines the PWM frequency. As the limit voltage varies in every switching cycle, the frequency spectrum of PWM signal spreads in light-load and no-load conditions; and therefore, the acoustic noise is suppressed. The feedback voltage and the supply voltage determine the switching period of the PWM signal. The maximum on-time is kept constant and the switching period is increased by increasing the off-time, such that the magnetic components, such as inductors and transformers, are prevented from being saturated.

4 Claims, 6 Drawing Sheets

PWM CONTROLLER HAVING ADAPTIVE OFF-TIME MODULATION FOR POWER SAVING

BACKGROUND OF INVENTION

1. Field of Invention

The present invention relates to a switching power supply. More particularly, the present invention relates to the pulse width modulation (PWM) of the switching power supply.

2. Background of the Invention

The PWM controller is an integrated circuit used in the switching power supply to control and regulate the switching duty cycle. Because of environmental regulations, the power of the computer and other electrical products have been required to meet the power management and energy conservation standards. The power management is to manage the system to consume power only during operation, with only very little power being consumed during the non-operation mode. With respect to the power supply in a power management application, how to save the power in the unloaded condition is a major concern. According to the invention, the object of the adaptive off-time modulation for the PWM control is to optimize the saving of the power consumption in lightly loaded and unload conditions.

FIG. 1 shows a traditional flyback circuit of the power supply, in which a PWM controller 100 controls the power output and achieves the regulation. The operation of PWM-control starts on the charging of capacitor 220 via a start-up resistor 210 when the power supply is turned on until the voltage $V_{CC}$ reaches the start-threshold voltage. Then the PWM controller 100 starts to output the PWM signal and drive the entire power supply. After the start-up, the supply voltage $V_{CC}$ is provided from the auxiliary bias winding of the transformer 400 through a rectifier 230. The resistor 240 converts the switching current of the transformer 400 to the voltage for the PWM control and over-power protection. If the auxiliary bias winding of transformer 400 cannot provide sufficient power for the supply voltage $V_{CC}$ the PWM controller 100 will be turned off as long as the supply voltage $V_{CC}$ is lower than the stop-threshold voltage. The feedback signal $V_{FB}$ is derived from the output of an optical-coupler 250. Through a resistor 290 and a zener diode 280, the input of the optical-coupler 250 is connected to the output of the power supply Vo to form the feedback loop. Through the control of the feedback loop, the voltage of the $V_{FB}$ controls the on-time Ton of the PWM signal through the PWM controller 100 and dominantly decides the output power.

Concerning the loss of the power supply for the lightly loaded condition, the major losses are proportional to the switching frequency F. The major losses include the transformer core loss, the transistor switching loss, and the snubber power loss, for example. The switching period T is the inverse of the switching frequency, T=1/F. The increase of the switching period T reduces the power loss. However, the switching frequency is restricted by a short on-time Ton of the switching period for the transformer and the power supply with size shrinkage. To prevent the saturation of the transformer, a shorter Ton is required. The power consumption of the power supply is reduced in response to the increase of switching period T in the lightly loaded and unloaded conditions. Nevertheless, it is unsafe to increase the switching period without the limitation of Ton since the transformer may saturate due to the extended Ton. The saturation of magnetic components, such as inductors and transformers, causes over-stress damage to the switching devices such as transistors and rectifiers. Although the decrease of the switching frequency will reduce the power consumption in the lightly loaded and unloaded conditions, it might create an audio noise if the switching frequency falls into the audio band. According to this invention, another object of the adaptive off-time modulation for the PWM control is to protect the magnetic components from being saturated and to reduce the acoustic noise when the switching frequency is decreased in the lightly loaded and unloaded conditions.

Varying the switching frequency and/or entering the "pulse-skipping" mode in accordance with the loaded condition have been disclosed to increase the regulator efficiency in prior art. For example, U.S. Pat. No. 6,100,675, "SWITCHING REGULATOR CAPABLE OF INCREASING REGULATOR EFFICIENCY UNDER LIGHT LOAD" (incorporated herein by reference) disclosed an oscillation frequency control circuit capable of varying an oscillation frequency of the oscillator circuit in response to loaded conditions. Another method is disclosed in U.S. Pat. No. 6,366,070 B1, "SWITCHING VOLTAGE REGULATOR WITH DUAL MODULATION CONTROL SCHEME", which disclosed the regulator employing three operation modes. In this patent, the switching components are operated at constant frequency for heavy loads, the dual modulation control scheme is used for moderate to light loads, and the regulator enters a "pulse-skipping" mode for light loads. The disadvantages of foregoing prior art are: (1) Varying the switching frequency without the limitation of maximum switching on-time may result in saturation of magnetic components and cause over-stress damage to the switching devices such as transistors and rectifiers; (2) The modulation of switching frequency is only controlled by the load condition, and there is no correlation with the supply voltage. In order to save more power in the lightly loaded and unloaded conditions, the switching frequency has to be reduced as low as possible. However, if the switching frequency is reduced too low, the auxiliary bias winding of the transformer or inductor might be unable to provide sufficient power for the supply voltage of the PWM controller. It may cause the PWM control to work improperly. To achieve the best power saving performance, correlating the frequency modulation with both load condition and supply voltage is necessary. (3) In the lightly loaded and unloaded conditions, the switching frequency might be decreased to the audio band (such as 200 Hz 8 KHz). If the magnetic components are not well impregnated, the audio band switching frequency might generate an undesirable acoustic noise.

Thus, there exists a need for a reliable, stable and noise-less apparatus for improving the efficiency and saving the power consumption in lightly loaded and unloaded conditions, while avoiding the shortcomings of prior art.

SUMMARY OF INVENTION

The above-referenced deficiencies in the prior art are addressed in the present invention, which provides a reliable, stable and noiseless method and apparatus.

The invention provides an adaptive off-time modulation for a PWM controller to increase the switching period in the lightly loaded and unloaded conditions. The off-time modulation is accomplished by moderating a bias current of an oscillator in the PWM controller. Reducing the bias current increases the switching period, while the off-time of the switching period is extended. The maximum on-time of the PWM signal is kept as a constant. The feedback voltage that is derived from a voltage feedback loop, and the supply voltage of the PWM controller are taken as the variables to correlate with the off-time modulation. The bias current is modulated as a function of the feedback voltage and supply voltage. A threshold voltage is a constant that defines the level of the light load. A limit voltage defines the low-level of the supply voltage. A first differential signal is generated by subtracting the threshold voltage from the feedback voltage. A second differential signal is generated by subtracting the supply voltage from the limit voltage. The sum of the first differential signal and the second differential signal is converted into the bias current. A limiter clamps the bias current to set up the minimum switching period in normal loaded and fully loaded conditions. Once the feedback voltage is decreased lower than the threshold voltage, the bias current is reduced and the off-time of the switching period is increased continuously. When the supply voltage is lower than the limit voltage, the bias current is increased and a maximum off-time of the switching period is determined. Furthermore, the limit voltage is a variable of time, while the variation is found in every switching cycle. The maximum on-time and the off-time of the PWM signal determine the PWM frequency. Due to the off-time of the PWM signal varying in every switching cycle, the frequency spectrum of PWM signal is spread in lightly loaded and/or unloaded conditions; and therefore the acoustic noise is suppressed. The feedback voltage and the supply voltage determine the switching period of the PWM signal. Keeping the maximum on-time as the constant and increasing the switching period by increasing the off-time prevent the magnetic components, such as inductors and transformers, from being saturated.

Advantageously, the adaptive off-time modulation improves the efficiency and saves the power of the power supply in the light-load and no-load conditions. Meanwhile, spreading the frequency spectrum of the PWM signal reduces the acoustic noise.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
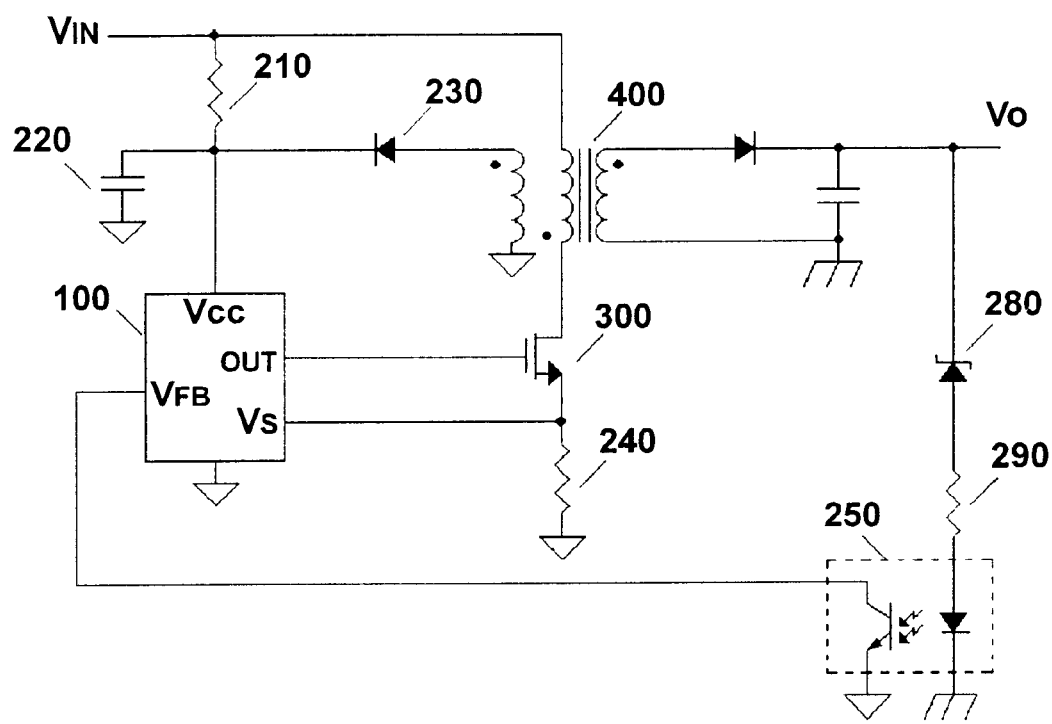
FIG. 1 shows a traditional flyback circuit of the power supply.
Figure 2:
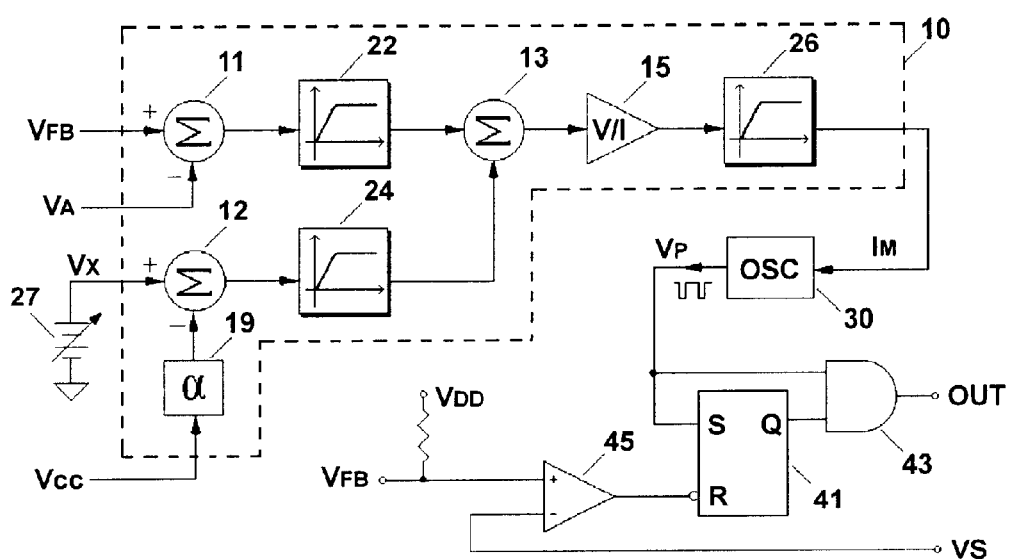
FIG. 2 shows the block diagram of adaptive off-time modulation according to one embodiment of the present invention.

FIG. 2 shows the block diagram of adaptive off-time modulator according to one embodiment of the present invention. A bias current synthesizer 10 generates a bias current $I_M$ for an oscillator 30 to determine the off-time of PWM signal. The threshold voltage $V_A$ is subtracted from the feedback voltage $V_{FB}$ via an adder 11 and generates the first differential signal. The output of the adder 11 is connected to the input of a limiter 22. The voltage attenuated from the supply voltage $V_{CC}$ by the attenuator $\alpha$ is subtracted from the limit voltage $V_X$ via an adder 12 and generates the second differential signal. The output of the adder 12 is connected to a limiter 24. The outputs of the limiter 22 and the limiter 24 are connected to the two inputs of an adder 13 respectively. A V-to-I converter 15 transfers the voltage derived from the output of the adder 13 into current signal. This current signal is clamped by a limiter 26 to create the modulated bias current IM. Reducing the bias current $I_M$ extends the oscillation period of the oscillator 30. The oscillator 30 outputs a pulse signal Vp to drive a RS flip-flop 41 and initiates a PWM cycle. The RS flip-flop 41 is reset through a comparator 45 when the current sense input Vs is higher than the feedback voltage $V_{FB}$. The logic low of pulse signal Vp represents the off-time of the oscillator 30. An AND gate 43 ensures the PWM signal output is turned off during the off-time of the oscillator 30. The bias current $I_M$ is a function of the supply voltage $V_{CC}$ and the feedback voltage $V_{FB}$.

$$S_A = (V_{FB} - V_A) \times K_A \quad (1)$$

$$S_B = [V_X - (\alpha \times V_{CC})] \times K_B \quad (2)$$

$$I_M = (S_A + S_B) \times K_C \quad (3)$$

In the above equations, the range of the output is clamped as $(0 \leq S_A \leq N_A)$, $(0 \leq S_B \leq N_B)$ and $(0 \leq I_M \leq I_{MAX})$; $K_C$ is the transfer rate of V-to-I converter 15.

The limiter 22 scales the first differential signal by $K_A$ and clamps its output into the range of zero to a first-maximum $N_A$. The limiter 24 scales the second differential signal by $K_B$ and clamps its output into the range of zero to a second-maximum $N_B$. The limiter 26 clamps the output of V-to-I converter 15 into the range of zero to a maximum-current $I_{MAX}$ to set up the minimum switching period in normal loaded and fully loaded conditions. Once the feedback voltage $V_{FB}$ is decreased lower than the threshold voltage $V_A$, the bias current is reduced according to the slope of $K_A$ and $N_A$ and the off-time of the switching period is increased continuously. When the attenuated supply voltage $(\alpha \times V_{CC})$ is lower than the limit voltage $V_X$, the bias current is increased in accordance to the slope of $K_B$ and $N_B$, and a maximum off-time o the switching period is determined.

Figure 3:
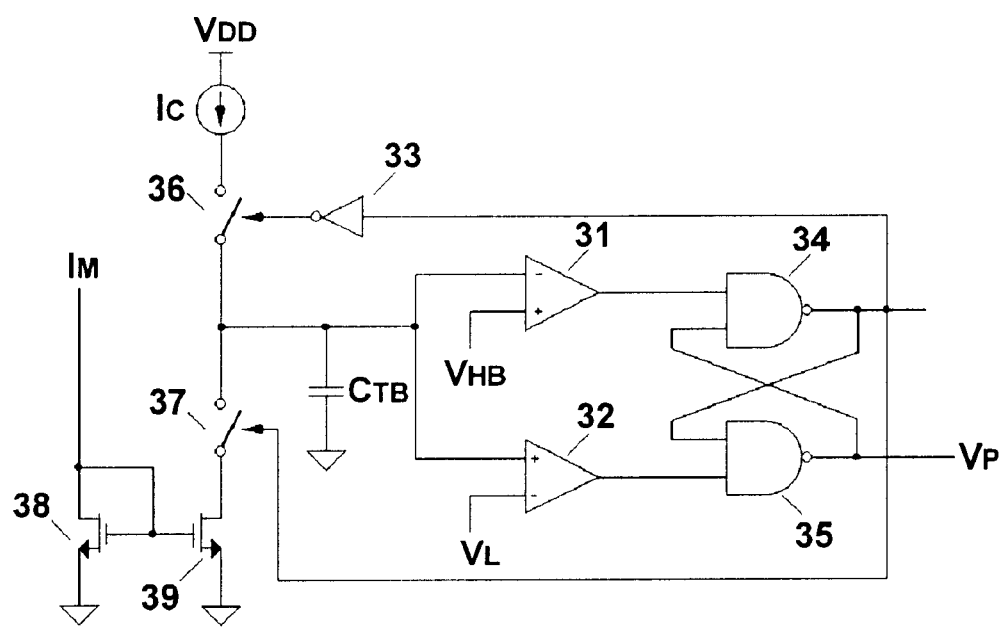
FIG. 3 is a circuit diagram illustrating the first preferred embodiment of the oscillator according to the present invention shown in FIG. 2.
Figure 4:
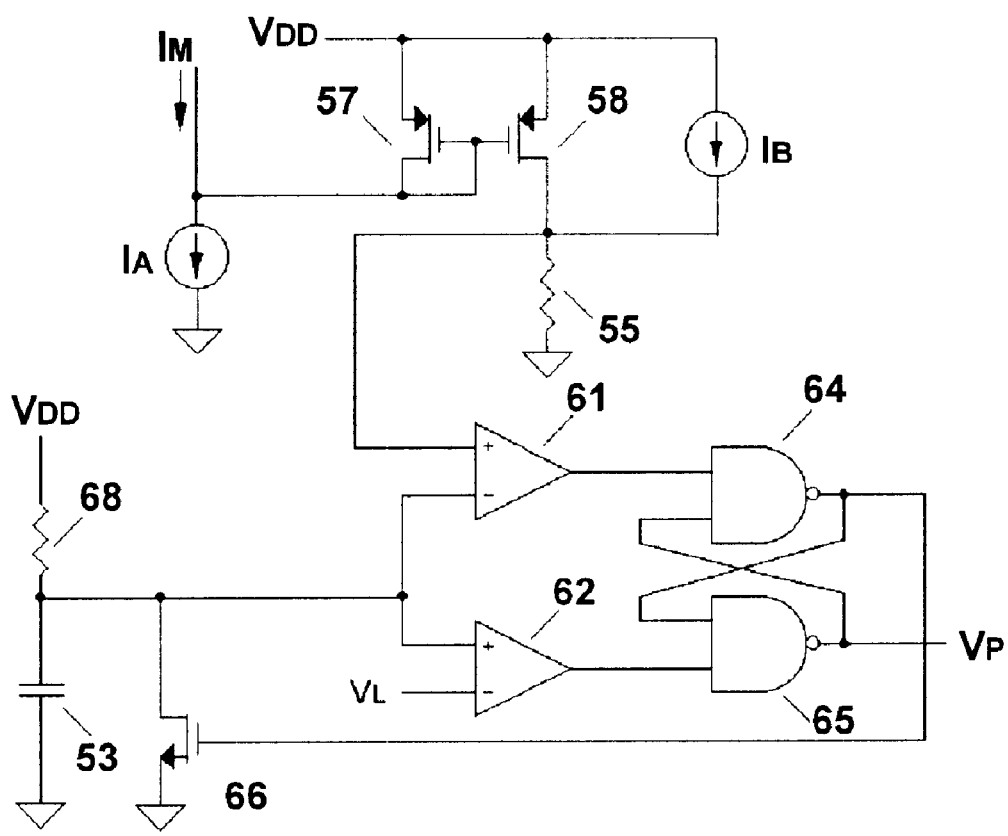
FIG. 4 is another circuit diagram illustrating the second preferred embodiment of the oscillator according to the present invention shown in FIG. 2.

FIG. 3 illustrates one Embodiment of the oscillator 30 according to the present invention shown in FIG. 2. The pulse signal $V_P$ is derived from the output of a NAND gate 35. At the initial state, the voltage applied to the capacitor $C_{TB}$ is zero. The output of a comparator 31 outputs a logic high signal to the input of a NAND gate 34. The output of a comparator 32 outputs a logic low signal to the input of the NAND gate 35. The output of the NAND gate 35 remains logic high. The NAND gate 34 outputs a logic low signal and drives a NOT gate 33 to turn on a switch 36. The constant current source $I_C$ starts to charge the capacitor $C_{TB}$. When the voltage on $C_{TB}$ is greater than $V_{HB}$, the NAND gate 34 outputs a high signal to turn off the switch 36 and enable a switch 37 to discharge the capacitor $C_{TB}$, A MOSFET 39 mirrors a discharge current from the bias current $I_M$ flowing through a MOSFET 38. This discharge current determines the off-time of the $V_P$ pulse signal. Thus, adjusting the bias current IM can achieve the off-time modulation of the oscillator 30. The on-time of the switching period is controlled through the feedback loop to regulate output of the power supply. The constant current source Ic determines the maximum on-time of the switching period. Increasing the switching period by only increasing the off-time prevents the magnetic components, such as inductors and transformers, from being saturated. The maximum on-time ($Ton_{(max)}$) and the off-time (Toff) of the switching period, and the switching frequency (F) of the PWM signal are expressed as follow:

$$T_{ON(max)} = [(V_{HB} - V_L) \times C_{TB}] \div I_C \quad (4)$$

$$T_{OFF} = [(V_{HB} - V_L) \times C_{TB}] \div I_M \quad (5)$$

$$F = \frac{1}{T_{ON} + T_{OFF}} \quad (6)$$

Figure 5:
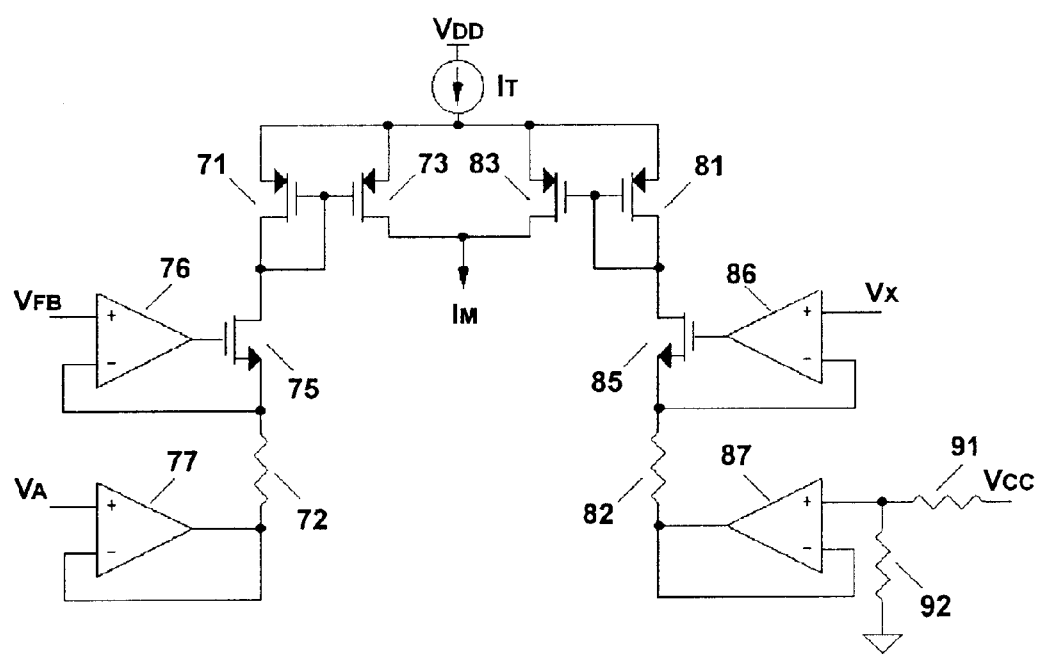
FIG. 5 is a circuit diagram illustrating the preferred embodiment of the bias current synthesizer according to the present invention shown in FIG. 2.

FIG. 5 shows an embodiment of the bias current synthesizer 10 of the PWM controller which includes a constant current source $I_T$ a first current mirror composed by a MOSFET 71 and a MOSFET 73, a second current mirror composed by a MOSFET 81 and a MOSFET 83, a first buffer amp 77, a second buffer amp 87, an attenuator composed of a resistor 91 ($R_{91}$ and a resistor 92 (R 92) a first operation amplifier (op amp) 76, a first V-to-I MOSFET 75, a second op amp 86, a second V-to-I MOSFET 85, a first resistor 72 ($R_{72}$) and a second resistor 82 ($R_{82}$) The feedback voltage VFB is connected to the positive input terminal of the first op amp 76. The threshold voltage VA is connected to the positive input terminal of the first buffer amp 77. The output of the first buffer amp 77 is connected to the negative input terminal of the first op amp 76 via the first resistor 72. The source of the first V-to-I MOSFET 75 is connected to the negative input terminal of the first op amp 76. The output of the first op amp 76 is connected to the gate of the first V-to-I MOSFET 75 for developing a first source-follow circuit to drive the first resistor 72. The drain of the first V-to-I MOSFET 75 is connected to the drain of the mirror MOSFET 71. The drain and gate of the mirror MOSFET 71 and the gate of the mirror MOSFET 73 are connected together. The source of the mirror MOSFET 71 and the source of the mirror MOSFET 73 are connected to the constant current source IT.

The limit voltage $V_X$ is connected to the positive input terminal of the second op amp. 86. The supply voltage $V_{CC}$ is connected to the positive input terminal of the second buffer amp 87 via the resistor 91. The resistor 92 is connected between the positive input terminal of the second buffer amp 87 and the ground. The output of the second buffer amp 87 is connected to the negative input terminal of the second op amp 86 via the second resistor 82. The source of the second V-to-I MOSFET 85 is connected to the negative input terminal of the second op amp 86. The output of the second op amp 86 is connected to the gate of the second V-to-I MOSFET 85 for developing a second source-follow circuit to drive the second resistor 82. The drain of the second V-to-I MOSFET 85 is connected to the drain of the mirror MOSFET 81. The drain and gate of the mirror MOSFET 81 and the gate of the mirror MOSFET 83 are connected together. The source of the mirror MOSFET 81 land the source of the mirror MOSFET 83 are connected to the constant current source $I_T$. The drain of the mirror MOSFET 73 and the drain of the mirror MOSFET 83 are connected together and output a bias current $I_M$. The threshold voltage $V_A$ is subtracted from the feedback $V_{FB}$ in the first op amp 76 to result in an output, which is input to the gate of the first V-to-I MOSFET 75 and converted to a current $I_{FB}$. This current generates a first current by the first current mirror and is output through the drain of the MOSFET 73. The limit voltage $V_X$ is subtracted by the supply voltage Vcc attenuated by the attenuator to result in an output, which is connected to the gate of the second V-to-I MOSFET 85 and converted to a current $I_{VCC}$. This current will generate a second current and will be output through the drain of the MOSFET 83. The first current is applied to the second current to form the bias current $I_M$. When the feedback voltage $V_{FB}$ is low and the supply voltage $V_{CC}$ is high, the bias current $I_M$ reduces linearly and extends the off-time of the oscillation period of the oscillator 30 shown in FIG. 2. On the contrary; when the feedback voltage $V_{FB}$ is high and/or supply voltage $V_{CC}$ is low, the $I_M$ increases gradually.

$$I_{FB} = [(V_{FB} - V_A) \div R_{72}] \times M_A \quad (7)$$

$$I_{VCC} = [(V_X - \alpha \times V_{CC}) \div R_{82}] \times M_B \quad (8)$$

$$I_M = I_{FB} + I_{VCC} \quad (9)$$

In the above equations, the range of the IM is clamped as ($I_M$ is larger than zero, $I_T$ is larger than $I_M$); $M_A$ is the transfer ratio of the first current mirror; $M_B$ is the transfer rate of the second current mirror; $\alpha$ is equal to $[R_{92}/R_{91} + R_{92})]$.

The minimum off-time of the PWM signal is determined by the constant current source IT as shown in equation (5) and (7)–(9).

Figure 6:
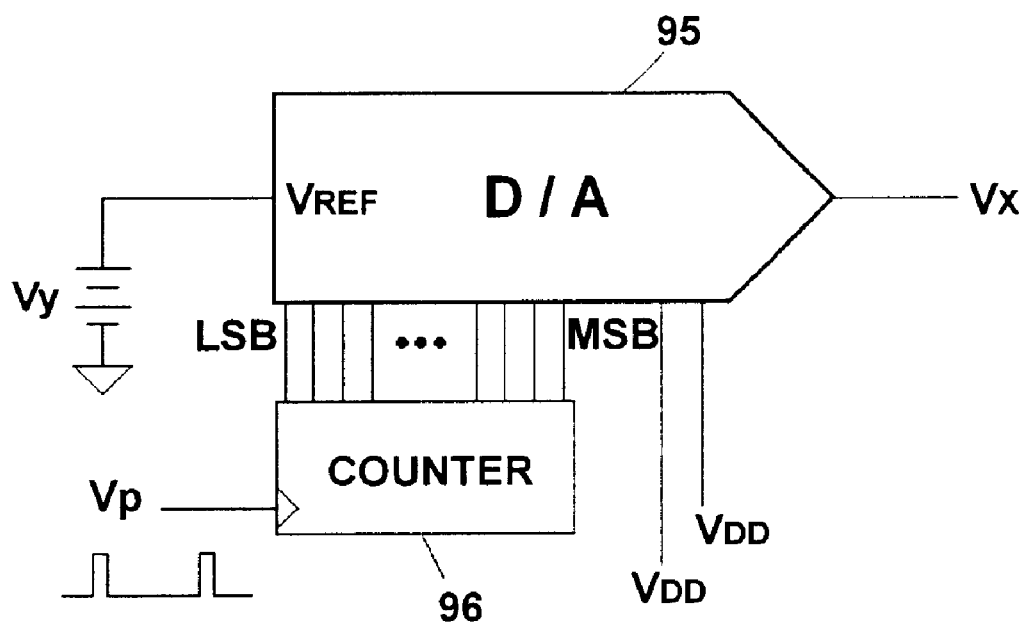
FIG. 6 is a circuit diagram illustrating the preferred embodiment of the limit voltage generator according to the present invention shown in FIG. 2.

FIG. 6 displays one embodiment of the limit voltage generation circuitry according to the present invention. The limit voltage generation circuitry includes a digital-to-analog converter 95, a reference voltage Vy, and a counter 96. The reference voltage Vy is connected to the VREF input of the digital-to-analog converter 95. The pulse signal VP serves as the clock input of the counter 96. By the continuous clocking of the counter 96, the digital-to-analog converter 95 outputs a variable limit voltage VX. Referring to equation (8) and (9), an inconsistent $I_B$ and $I_M$ will be produced when the attenuated Vcc ($\alpha \times Vcc$) is lower than the changeable limit voltage Vx in lightly loaded and/or unloaded conditions. Because the IM is changed in every switching cycle that produces an altering off-time of the PWM switching period according to the equation (5) and (6), when the PWM switching frequency falls into the audio band, the changeable limit voltage $V_X$ will spread the frequency spectrum of the PWM signal to disperse the energy and effectively reduce the acoustic noise.

As described above, the PWM controller including an adaptive off-time modulation of the present invention can reduce the power consumption for the power supply in light-load and no-load conditions. Furthermore the acoustic noise is reduced in response to the decrease of PWM frequency.

It will be apparent to those skilled in the art that various modifications and variations can be made to the structure of the, present invention without departing from the scope or spirit of the invention. In view of the foregoing, it is intended that the present invention cover modifications and variations of this invention provided they fall within the scope of the following claims and their equivalents.

What is claimed is:

1. A PWM controller having an adaptive off-time modulator comprising:
   a bias current synthesizer having four inputs and one output to generate a bias current that determines an off-time of a PWM switching period;
   an oscillator having an input connected to the output of the bias current synthesizer for generating a pulse-signal for PWM switching, wherein a maximum on-time of the pulse-signal, is a constant and an off-time of the pulse-signal is increased as the bias current decreases;

a RS flip-flop generating an on-off signal, wherein the RS flip-flop is set by the pulse-signal and reset by a feedback control;

an AND-gate having two input terminals for outputting a PWM signal, wherein a first input terminal of the AND-gate is connected to the pulse-signal and a second input terminal of the AND-gate connected to the on-off signal;

a feedback voltage connected to a first input of the bias current synthesizer, wherein the feedback voltage is derived from the voltage feedback loop of the power supply for controlling the on-time of the PWM signal and regulating the output of the power supply; and a threshold voltage is connected to a second input of the bias current synthesizer to determine the level of a light-load condition;

a limit voltage connected to a third input of the bias current synthesizer to determine the level of a low supply voltage; wherein the limit voltage is changed in every PWM switching cycle which affects the bias current to produce a variable PWM switching frequency when the PWM switching frequency is decreased in the light-load and no-load conditions; and a supply voltage connected to a fourth input of bias current synthesizer, in which the supply voltage is the power supply voltage of the PWM controller; wherein the bias current is a function of the feedback voltage, the threshold voltage, the supply voltage, and the limit voltage, such that when the feedback voltage is lower than the threshold voltage, the bias current starts to reduce in response to the decrease of the feedback voltage, and if the supply voltage is lower than the limit voltage, the bias current starts to increase in response to the decrease of the supply voltage.

2. The PWM controller as claimed in claim 1, wherein the bias current synthesizer comprising:

a first adder, operative to subtract the threshold voltage from the feedback voltage;

an attenuator providing the attenuation for the supply voltage; a second adder, operative to subtract the output of the attenuator from the limit voltage;

a first limiter for scaling and clamping the output of the first adder to a first differential signal, wherein the amplitude of the first differential signal is in the range of zero to a first-maximum;

a second limiter for scaling and clamping the output of the second adder to a second differential signal, in which the amplitude of the second differential signal is in the range of zero to a second-maximum;

a third adder, whereby the first differential signal is added with the second differential signal;

a V-to-I converter for converting the output of the third adder to a V-to-I current;

a third limiter for clamping the V-to-I current to the bias current, in which the amplitude of the bias current is in the range of zero to a current-maximum, wherein the current-maximum determines the minimum off-time of the PWM switching period, the first-maximum determines the slope of the change of the bias current in response to the variation of the feedback voltage, and the second-maximum determines the slope of the change of the bias current in response to the variation of the supply voltage.

3. The PWM controller as claimed in claim 1, wherein the bias current synthesizer comprising:

a first operation amplifier having a positive input, a negative input and an output, in which the positive input is connected to the feedback voltage;

a first buffer amplifier having a positive input, a negative input and an output, in which the negative input is connected to the output and the positive input is connected to the threshold voltage;

a first V-to-I transistor having a gate, a source and a drain, in which the gate is driven by the output of the first operation amplifier, and the source is connected to the negative input of the first operation amplifier developing a first source follow circuit;

a first resistor connected between the output of the first buffer amplifier and the source of the first V-to-I transistor; wherein the threshold voltage is subtracted from the feedback voltage via the first resistor generating a FB-current;

a divider;

a second operation amplifier having a positive input, a negative input and an output, in which the positive input is connected to the limit voltage;

a second buffer amplifier having a positive input, a negative input and an output, in which the negative input is connected to the output and the positive input is connected to the supply voltage through the divider;

a second V-to-I transistor having a gate, a source and a drain, in which the gate is driven by the output of the second operation amplifier, and the source is connected to the negative input of the second operation amplifier developing a second source follow circuit;

a second resistor connected between the output of the second buffer amplifier and the source of the second V-to-I transistor; wherein the supply voltage via the divider is subtracted by the limit voltage, and then through the second resistor to generate a VCC-current;

a first-input transistor having a gate, a source and a drain;

a first-output transistor having a gate, a source and a drain, in which the source of the first-input transistor and the source of the first-output transistor are connected together, wherein the drain of the first V-to-I transistor and the drain of the first-input transistor, and the gate of the first-input transistor and the gate of the first-output transistor are connected together to form a first mirror amplifier; wherein the FB-current drives the first mirror amplifier to generate a first mirror current;

a second-input transistor having a gate, a source and a drain;

a second-output transistor having a gate, a source and a drain, in which the source of the second-input transistor and the source of the second-output transistor are connected together; wherein the drain of the second V-to-I transistor and the drain of the second-input transistor, and the gate of the second-input transistor and gate of the second-output transistor are connected together to form a second mirror amplifier; wherein the VCC-current drives the second mirror amplifier to generate a second mirror current; and a limit current-source connected to the source of the first-input transistor, the source of the first-output transistor, the source of the second-input transistor and the source of the second-output transistor for clamping the maximum output current of the bias current; wherein the drain of the first-output transistor and the drain of the second-output transistor are connected together to achieve the first mirror current summed with the second mirror current to generate the bias current.

4. The PWM controller as claimed in claim 1, wherein the limit voltage comprising:

a counter for generating the code, in which a clock of the counter is driven by the pulse-signal;

a digital-to-analog converter for generating a variable limit voltage according to the clock of the pulse-signal, wherein the output of the counter drives the digital-to-analog converter; and a constant reference voltage providing a reference voltage for the digital-to-analog converter.

* * * * *